Oct. 1, 1929.    W. B. THOMPSON    1,729,634
METHOD OF SPRAYING
Filed May 10, 1926
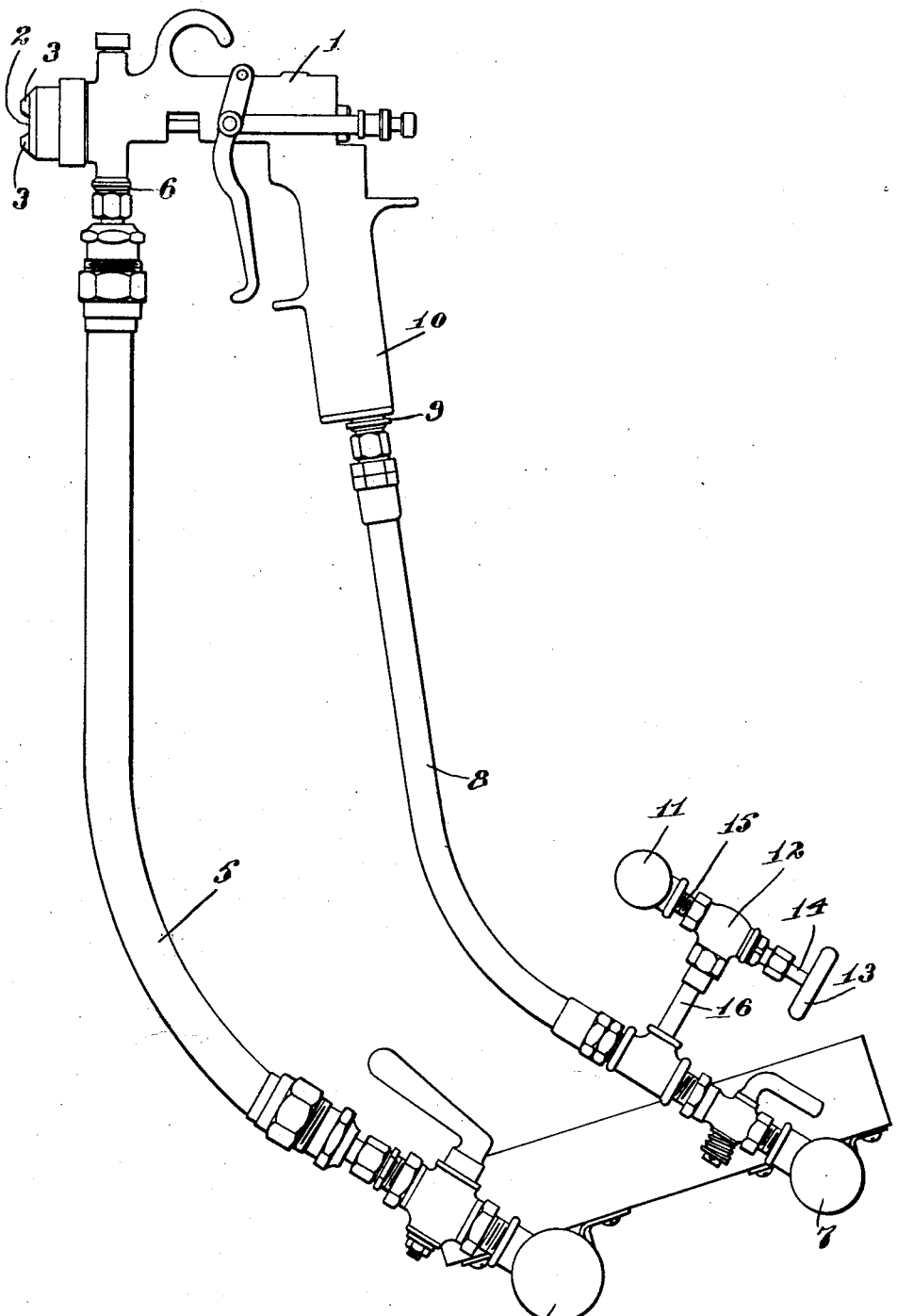

Patented Oct. 1, 1929

1,729,634

UNITED STATES PATENT OFFICE

WAYNE B. THOMPSON, OF WINCHESTER, MASSACHUSETTS

METHOD OF SPRAYING

Application filed May 10, 1926. Serial No. 107,868.

The present invention relates to the art of spraying, and more particularly to the art of spraying liquids which have a strong tendency to clog spray guns, such for instance as water glass.

Substances sold under the name of water glass are silicates of sodium, or potassium, or both. Water glass has many industrial uses among which may be mentioned, as an addition to yellow or laundry soaps; as a fixative of pigments in calico printing; as a vehicle for pigments in fresco painting; for rendering cloth and paper draperies non-inflammable; as a preservative of timber and porous stone; in the manufacture of artificial stone; and in cement mixtures for glass, pottery, wood and leather. In making one type of asbestos pipe covering the asbestos is first corrugated and then coated with water glass so that when the coated and corrugated asbestos is baked the corrugations will become permanently set. It is highly desirable that the coating of water glass be applied to the corrugated sheet of asbestos with a spray gun but heretofore this has been impracticable owing to the tendency of the water glass to clog the gun.

The object of the present invention is to provide a method of supplying spray guns with fluids for discharge therefrom in order to make spray guns available for use in industry for spraying a liquid having a tendency to clog such, for instance, as water glass.

To the accomplishment of this object, and such others as may hereinafter appear, the various features of the invention relate to certain methods hereinafter described and then set forth in detail in the appended claims which possess advantages readily apparent to those skilled in the art.

The various features of the present invention will be readily understood from an inspection of the accompanying drawings showing the best method of practising the invention at present known to the inventor, in which, The figure is an elevation of an apparatus for use in supplying a spray gun with fluids for discharge therefrom.

The spray gun 1 may be, and preferably is, the spray gun disclosed in my application filed November 6, 1925, Serial No. 67,266. In this gun, as in many spray guns, the material to be sprayed and the motive agent, such as air under pressure, are discharged through a central orifice in the front face 2 of the gun and the cloud so discharged is acted upon by supplemental jets of motive agent discharged through supplemental jet members 3.

The material to be sprayed, in this instance a liquid, having a strong tendency to clog the spray gun, such as water glass, is conducted to the spray gun 1 from a header 4 through a conduit 5 connecting to a fitting 6 on the body of the spray gun 1. The motive agent under pressure, such as compressed air, is conducted to the spray gun 1 from a header 7 through a conduit 8 connected to a fitting 9 carried by the handle 10 of the spray gun 1.

If the spray gun is used to discharge the water glass and the compressed air supplied to it through the conduits 5 and 8, respectively, the water glass will become deposited on the front face 2 of the spray gun 1. This deposit of water glass hardens and builds up sufficiently to close not only the orifice on the face 2 but the orifices of the supplemental jet members 3 thus putting the gun out of commission.

In order to prevent the water glass from depositing on the face 2 of the gun the compressed air is treated to render it cool or it may be treated to render it moist. If the surface 2 is maintained cool or moist and preferably both cool and moist the particles of water glass which are deposited on the surface 2 by eddy currents cannot stick on and are soon blown off. Preferably the compressed air is provided with cold water so that it is supersaturated and thus rendered both cool and moist. This cold water is sprayed on the surface 2 so that the particles of water glass which may be deposited thereon by eddy currents cannot stick and are soon blown off on to the surface being treated with the water glass. The water with which the compressed air is provided is carried in a header 11 from which it is forced into the air conduit 8 through an angle needle valve 12 controlled by a handle 13 on one end of the needle stem 14. The valve 12 is connected to the water header 11 and air conduit 8 by pipe connections 15 and 16, respectively. Only a small amount of water is needed. This water is, however, under a higher pressure than the air pressure in order to prevent the air blowing back from the conduit 8 through the needle valve 12.

It will be understood that the invention is not limited in its application to any specific form of spray gun or to any specific apparatus for supplying the spray gun with fluids for discharge therefrom, but that it may be successfully practised with the aid of a great variety of mechanisms or apparatus, the foregoing being intended by way of explanation rather than limitation.

What is claimed as new, is:

1. That improvement in the art of spraying water glass with a spray gun which consists in conducting the water glass to the spray gun, conducting a motive agent under pressure to the spray gun, and providing the motive agent with cold water before its discharge from the gun.

2. That improvement in the art of spraying water glass with a spray gun which consists in conducting the water glass to the spray gun, conducting a motive agent under pressure to the spray gun, and providing the motive agent with moisture before its discharge from the gun.

In testimony whereof I have signed my name to this specification.

WAYNE B. THOMPSON.